United States Patent [19]

Kikuchi et al.

[11] Patent Number: 4,807,044
[45] Date of Patent: Feb. 21, 1989

[54] IMAGE PROCESSING APPARATUS

[75] Inventors: Yutaka Kikuchi, Kawasaki; Nao Nagashima; Junko Kiso, both of Yokohama, all of Japan

[73] Assignee: Canon Kabushiki Kaisha, Tokyo, Japan

[21] Appl. No.: 945,897

[22] Filed: Dec. 24, 1986

[30] Foreign Application Priority Data

Dec. 27, 1985 [JP] Japan ................................ 60-293288
Dec. 27, 1985 [JP] Japan ................................ 60-293289

[51] Int. Cl.[4] ............................................. H04N 1/40
[52] U.S. Cl. ................................... 358/280; 358/282; 358/287

[58] Field of Search ................. 358/280, 282, 287, 77; 382/47

[56] References Cited

U.S. PATENT DOCUMENTS 4,656,524  4/1987  Norris et al. ......................... 358/280

Primary Examiner—Edward L. Coles, Sr.
Attorney, Agent, or Firm—Fitzpatrick, Cella, Harper & Scinto

[57] ABSTRACT

There is disclosed an image processing apparatus capable of forming a mirror image in an arbitrary manner. For this purpose the image signal is stored in a memory, and is read in the inverse order starting from a reference point designated in the memory.

23 Claims, 7 Drawing Sheets

IMAGE PROCESSING APPARATUS

BACKGROUND OF THE INVENTION

1. Field of the Invention

The present invention relates to an image processing apparatus for electrically processing an image.

2. Related Background Art

There are recently employed so-called digital copying machines in which an original image is read with an image sensor such as CCD, then converted into a digital image signal, subjected to image processing, and finally recorded on a printer such as a laser beam printer. Such apparatus can have various additional image processing functions, utilizing the conversion of the original image into the digital image signal, as disclosed in the U.S. patent application Ser. No. 188,260 of the present applicant. One of such functions is the formation of a mirror image, which is often utilized in the field of design work.

Such mirror image formation is achieved by sequentially storing the image signal, read by an image sensor, in a shift register, and reading thus stored image signal in the inverse order for supply for example to a printer.

However it has not been possible to vary the reference position for such mirror image processing or to synthesize a mirror image with the normal original image.

SUMMARY OF THE INVENTION

In consideration of the foregoing, an object of the present invention is to provide an image processing apparatus easily capable of a desired mirror image formation.

Another object of the present invention is to provide an image processing apparatus in which the reference position for mirror image forming can be arbitrarily selected.

Still another object of the present invention is to provide an image processing apparatus capable of synthesizing a normal image and a mirror image.

Still another object of the present invention is to provide an image processing apparatus capable of forming a mirror image not only in the main scanning direction but also in the sub scanning direction.

The foregoing and still other objects of the present invention, and the advantages thereof, will become fully apparent from the following description.

DETAILED DESCRIPTION OF THE PREFERRED EMBODIMENTS

Now the present invention will be clarified in detail by embodiments thereof shown in the attached drawings.

Figure 1:
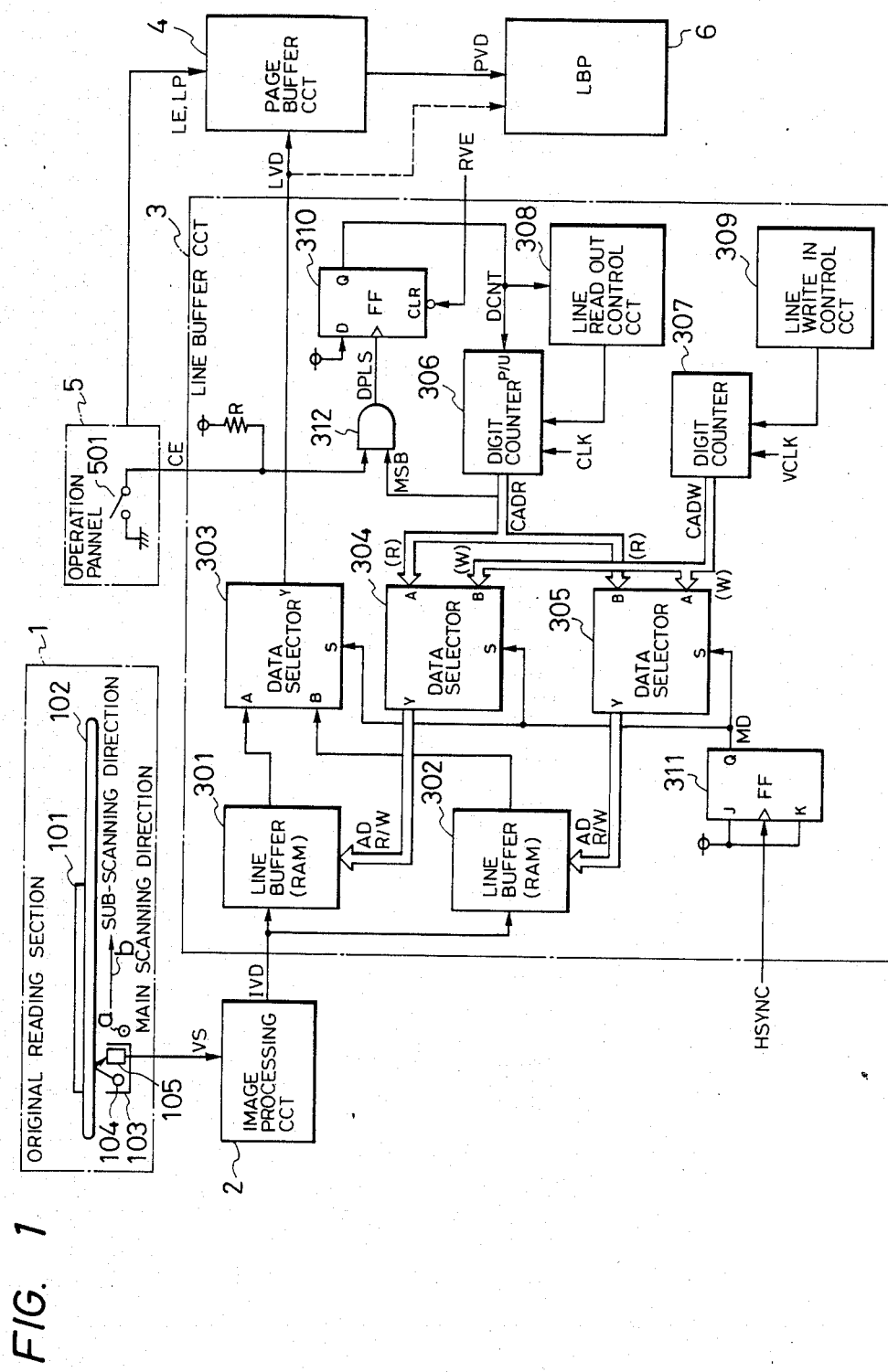
FIG. 1 is a block diagram of a digital copying apparatus embodying the present invention.

FIG. 1 is a block diagram of a digital copying apparatus embodying the present invention, wherein an original document 101 is placed, with a face to be read downwards, on an original supporting glass 102. An image reading unit 103, composed of an original illuminating light source 104 and a contact line image sensor 105 for main scanned, is moved in a sub-scanning direction b, by an unrepresented optical scanning drive system, to read the entire original image. More specifically, the image of a line in the main scanning direction a is at first read, and the reading line is successively moved in the sub-scanning direction b by said scanning drive system to obtain a serial image signal VS. Said serial image signal VS obtained from the contact line image sensor 105 is subjected to image processing such as A/D conversion and shading correction in an image processing circuit 2, and entered into line buffers 301, 302 in the form of a binary digital image signal IVD.

Figure 2:
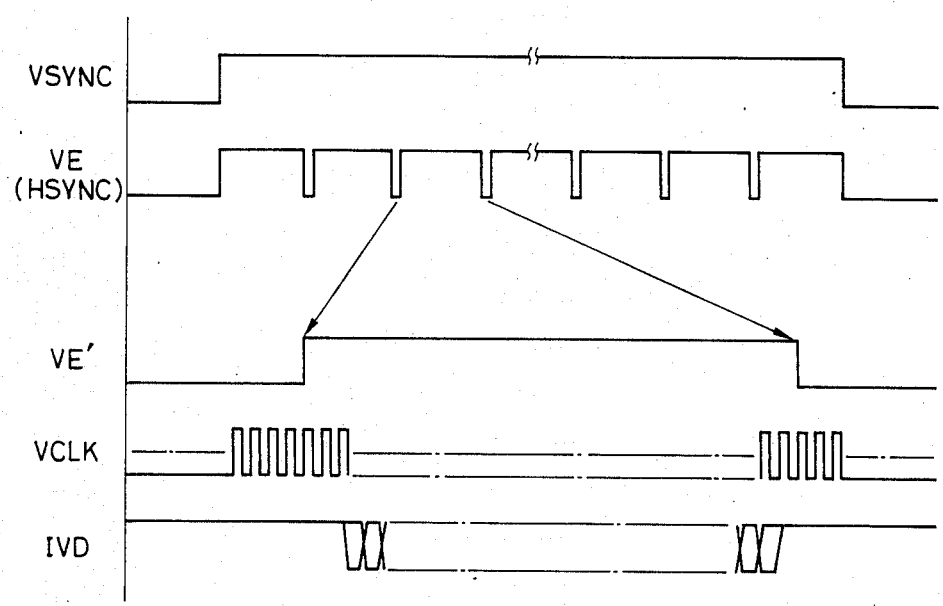
FIG. 2 is a timing chart showing principal timing signals in said embodiment.

FIG. 2 is a timing chart showing principal timing signals in said embodiment, wherein a vertical synchronization signal VSYNC represents the effective period of the serial image signal VS in the sub-scanning direction, while a video enable signal VE, generated in synchronization with a horizontal synchronization signal HSYNC, represents the effective period of the image signal VS (IVD) of a line in the main scanning direction. FIG. 2 also shows a signal VE' representing an enlarged portion of the signal VE. These signals VSYNC, HSYNC, VE and the image signal IVD are generated in synchronization with a clock signal VCLK.

When the image data IVD of a line is stored in the line buffer 301, those of a preceding line are read from the line buffer 302. Thus the matching of the timing and frequency of various signals is attained between an image reading section 1 and a laser beam printer 6, by writing the image data in one of the line buffers and simultaneously reading the image data from the other.

More detailedly, in response to the horizontal synchronization signal HSYNC, a JK flip-flop 311 inverts the output signal thereof Q or MD, according to which a data selector 303 selects the data read from the line buffer 301 or 302 to constitute continuous image data LVD. Also in response to said signal MD, data selectors 304, 305 switch read/write signals R/W and address signals AD for the line buffers 301, 302. During the high-level state of the signal MD, each of the data selectors 303–305 selects an input terminal B. Thus the line buffer 301 receives a write-in address CADW and write-in pulses of a digit counter 307, while the line buffer 302 receives a read-out address CADR of a digit counter 306. Thus, in this state, new image data IVD are supplied to the line buffer 301, while the image data of a preceding line are read from the line buffer 302.

On the other hand, during the low-level state of the signal MD, each of the data selectors 303–305 selects the input terminal A thereof. Consequently the line buffer 301 receives the read-out address CADR of the digit counter 306, while the line buffer 302 receives the write-in address CADW and write-in pulses of the digit counter 307. Thus, in this state, new image data IVD is stored in the line buffer 302 while the image data of a preceding line is read from the line buffer 301.

The digit counter 307 is composed of an up counter for generating the write-in address CADW for the line buffers 301, 302 under the control of a line write-in control circuit 309 and in response to a clock signal VCLK. In response the image data IVD is written over the entire scale of the main scanning line, for example addresses 0 to 4095. Also the digit counter 306 is composed of an up/down counter for generating the read-out address CADR for the line buffers 301, 302 under the control of a line read-out control circuit 308 and in response to a clock signal. In response the image data CVD is read either over the entire range of the main scanning line for example from address 0 to 4095, or said reading is reversed in the way, for example at first from address 0 to 2047 and then from address 2047 to 0. It is therefore rendered possible to release a normal image as entered, or a synthesized image of such normal image and a mirror image.

More specifically, an AND gate 312 receives a mirror image bias signal CE in the main scanning direction, received from a switch 501 of an operation panel 5. Said signal CE is biased by a pull-up resistor R, so that the mirror image forming operation in the main scanning direction is disabled or enabled respectively when said switch 501 is closed or opened. The AND gate 312 also receives the uppermost or most significant bit MSB of the digit counter 306. Thus, when said operation is enabled, a trigger signal DPLS is released in response to the turning-on of said uppermost bit MOS. A D-type flip-flop 310 is reset by a signal RVE at the start of each main scanning, and is set by said trigger signal DPLS generated in the course of the main scanning.

The output signal DCNT of said flip-flop 310 controls the counter 306 to an upcount mode or a downcount mode, respectively when the signal DCNT is at the low-level or high-level state.

Figure 3:
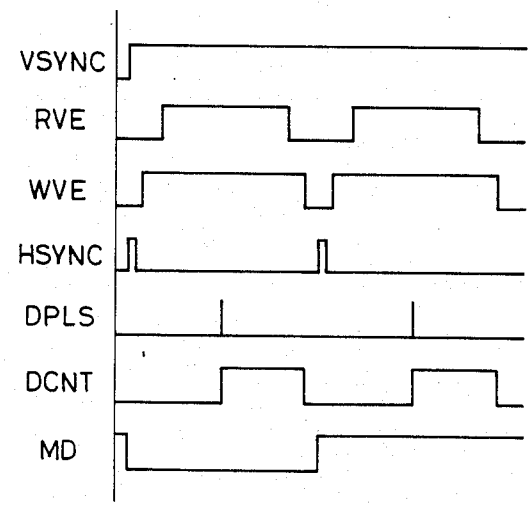
FIG. 3 is a timing chart showing the function of the apparatus shown in FIG. 1.
Figure 5:
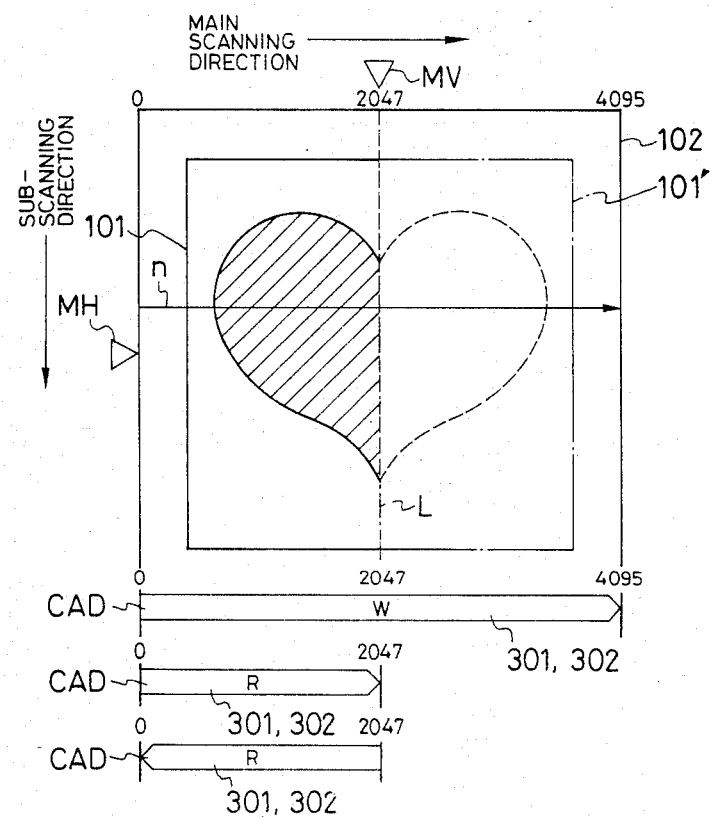
FIG. 5 is a schematic view showing a mirror image forming operation in the main scanning direction.

FIG. 3 is a timing chart for explaining the function of the apparatus shown in FIG. 1, wherein a signal RVE is the video enable signal VE at a read-out operation, and a signal WVE is a video enable signal VE at a write-in operation. In the present embodiment, for the purpose of clarity, it is assumed that the image data of each main scanning line is composed of 4096 bits, and that there is generated a mirror image which is line symmetric with respect to the center of the read image in the main scanning direction. Consequently in case of reading an entire main scanning line of the original supporting glass 102 with 4096 bits as shown in FIG. 5, the inversion axis of the mirror image lies on a broken line L at the central address 2047. In such case the digit counter 306 can have a capacity of 12 bits, of which the uppermost bit, corresponding to a count of 2048, can be utilized for generating the trigger signal DPLS.

More detailedly, the read-out address is set to "1" after the initial image data at an address 0 is read. Thus the image data at the address 2047 is read as the 2048th data, and then the read-out address is set to "2048", thus setting the uppermost bit MSB. When the mirror image forming operation is enabled, the AND gate 312 generates the signal DPLS, thus setting the flip-flop 310 at the start of said signal. The output signal DCNT of said flip-flop 310 shifts the digit counter 306 from the upcount mode to the downcount mode, and is also supplied to the line read-out control circuit 308, for generating a "−1 count pulse" therefrom. In response to the upshift of the signal DCNT, said circuit 308 generates an excessive pulse with a predetermined delay. In response, the digit counter 306, which is already in the downcount mode at this point, is decreased by one to "2047". Consequently the inverted read-out of the image data starts from the address 2047.

FIG. 5 shows a mirror image forming operation in the main scanning direction. The image data IVD is stored from address 0 to 4095 in each of the line buffers 301, 302, and the read-out operation is reversed at the address 2048. In this manner a normal image 101 and a mirror image 101' are synthesized.

Figure 4:
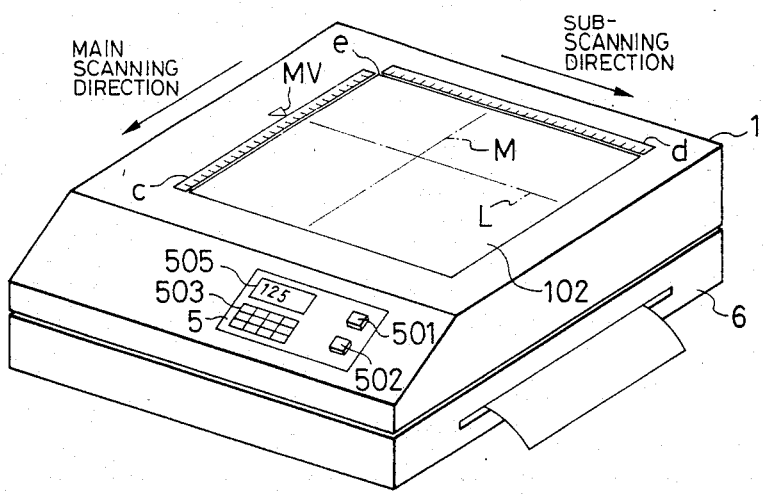
FIG. 4 is an external perspective view of said embodiment.

FIG. 4 is an external perspective view of the apparatus of the present embodiment. The operator places the original document, with the image inverting position thereof aligned with a reference line L indicating the inversion axis of the mirror image in the main scanning direction. Scales c and d, respectively, indicate the distances from a reference point e in the main and sub scanning directions. If said inversion axis 1 of the main scanning directions is fixed at the address 2048 (102.4 mm), said axis may be indicated by a mark MV. The mirror image can be formed in the sub-scanning direction as will be explained later, and the position of corresponding inversion axis can be arbitrarily set with numeral keys 503 of a console 5. The selected value is shown on a display unit 505, and the scale d can be utilized for such setting.

In the above-explained embodiment, the inversion axis for forming a mirror image is fixed, and the mirror image forming operation is effected with respect to a predetermined position of the original supporting glass 102. Consequently the original image has always to be aligned with said inversion axis, and such alignment is not possible for certain sizes or shapes of the original. The mirror image formation cannot therefore be achieved in such case. In the following there will be explained an embodiment in which the inversion axis of the mirror image can be arbitrarily adjusted.

Figure 6:
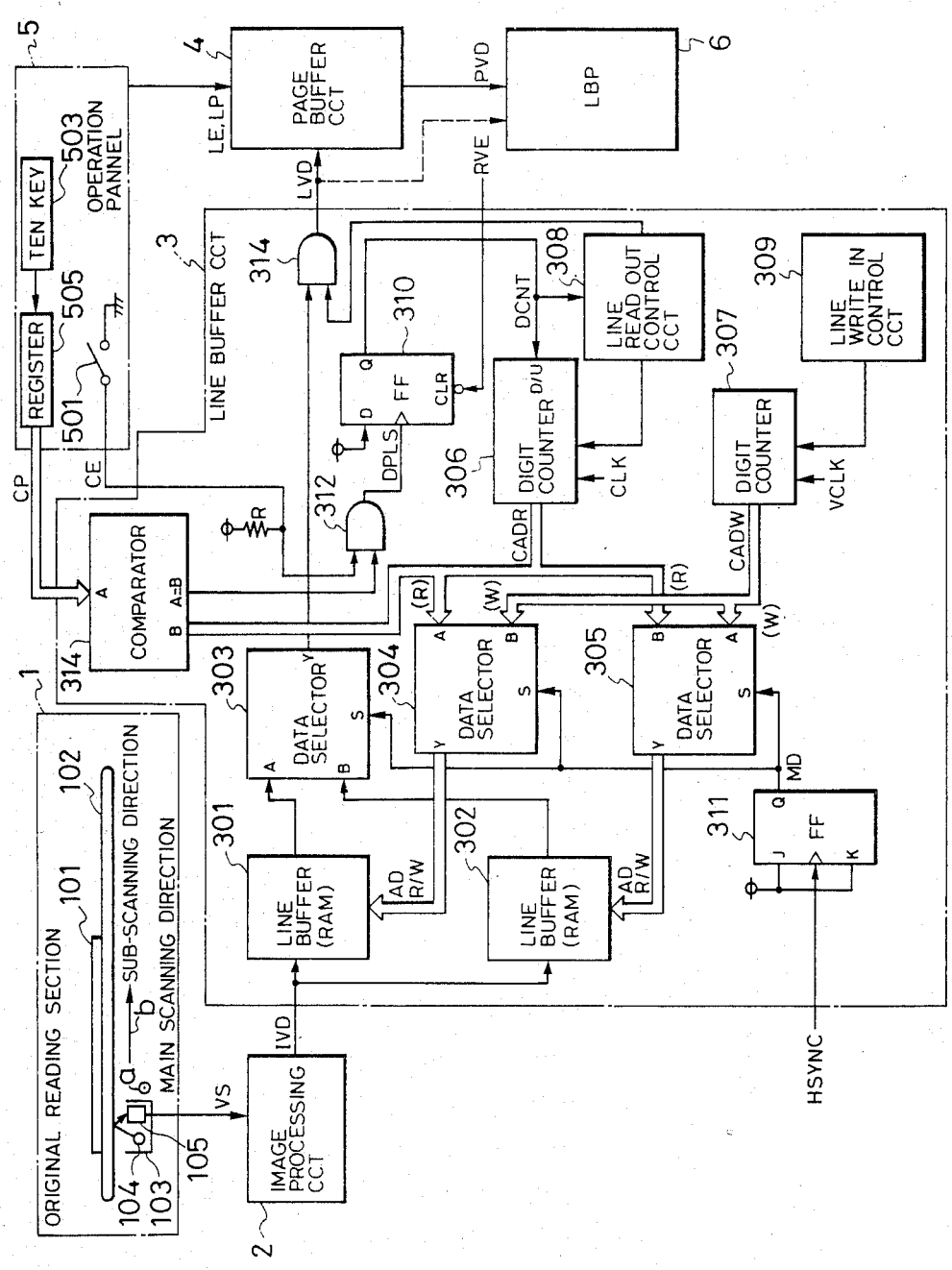
FIG. 6 is a block diagram of another embodiment of the digital copying apparatus.

FIG. 6 is a block diagram of a digital copying apparatus capable of arbitrarily setting the inversion axis of the mirror image, wherein same components as those in FIGS. 1 and 2 are represented by same numbers or symbols and will not be explained in detail.

It is assumed the contact line image sensor 105 of the present embodiment has a resolving power of 16 dot/mm, and the image data have 4752 bits per main scanning, corresponding to a reading width of 297 mm × 16 dot/mm.

The digit counter 307 is composed, in the present embodiment, of an up counter for generating the write-in address CADW for the line buffers 301, 302 under the control of a line write-in control circuit 309 and in response to a clock signal VCLK. In response the image data IVD are written over the entire scale of the main scanning line, for example address 0 to 4751. Also the digit counter 306 is composed, in the present embodiment, of an up/down counter for generating the read-out address CADR for the line buffers 301, 302 under the control of a line read-out control circuit 308 and in response to a clock signal CLK. In response the reading of the image data LVD is conducted either (a) over the entire scale (address 0 to 4751), or (b) reversed at a certain point (for example at first a reading from address 0 to 1999, followed by a reading from address 1999 to 0), or (c) substantially in the inverse manner (for example the counter 310 counts from address 0 to 1999 at a high speed, or address 1999 is preset therein, and the reading is conducted from address 1999 to 0). It is therefore rendered possible to release a normal image, a normal image and a mirror image, or a mirror image alone.

More specifically, the AND data 312 receives a mirror image bias signal CE in the main scanning direction, received from the switch 501 of the operation panel 5. Said signal CE is biased by the pull-up resistor R, so that the mirror image forming operation in the main scanning direction is disabled or enabled respectively when said switch 501 is closed or opened. The inversion axis for the mirror image formation can be designated, for example at a position of b 125 mm from the reference side, by entering "125" with numeral keys 503. This value is multiplied by 16 with an unrepresented multiplier, and a corresponding address value "2000" is stored in a register 505, and is supplied to an input terminal A of the comparator 314. The other input terminam B receives the read-out address CADR which is given by the count of the digit counter 306. Thus, when the digit counter 306 counts up to a designated row, the output terminal A=B of the comparator 314 release a high-level signal whereby the trigger signal DPLS is released from the AND gate 312 if the mirror image forming operation in the main scanning direction is enabled, corresponding to the opened state of the switch 501.

The D-type flip-flop 310 is reset by a signal RVE at the start of each main scanning, and is set by said trigger signal DPLS generated in the course of the main scanning. The output signal DCNT of said flip-flop 310 controls the counter 306 to an upcount mode or a downcount mode, respectively when the signal DCNT is at the low-level or high-level stage.

More detailedly, the read-out address is set to "1" after the initial image data at an address 0 is read. Thus the image data at the address 1999 is read as the 2000th data, and then the read-out address is set to "2000". If the register 505 stores a value "2000", the output terminal A=B of the comparator 314 releases a high-level signal. When the mirror image forming operation is enabled, the AND gate 312 generates the signal DPLS, thus setting the flip-flop 310 at the start of said signal. The output signal DCNT of said flip-flop 310 shifts the digit counter 306 from the upcount mode to the downcount mode, and is also supplied to the line read-out control circuit 308, for generating a "−1 count pulse" therefrom. In response to the upshift of the upshift of the signal DCNT, said circuit 308 generates an excessive pulse with a predetermined delay. In response, the digit counter 306, which is already in the downcount mode at this point, is decreased by one to "1999". Consequently the inverse read-out of the image data starts from the address 1999.

Figure 7:
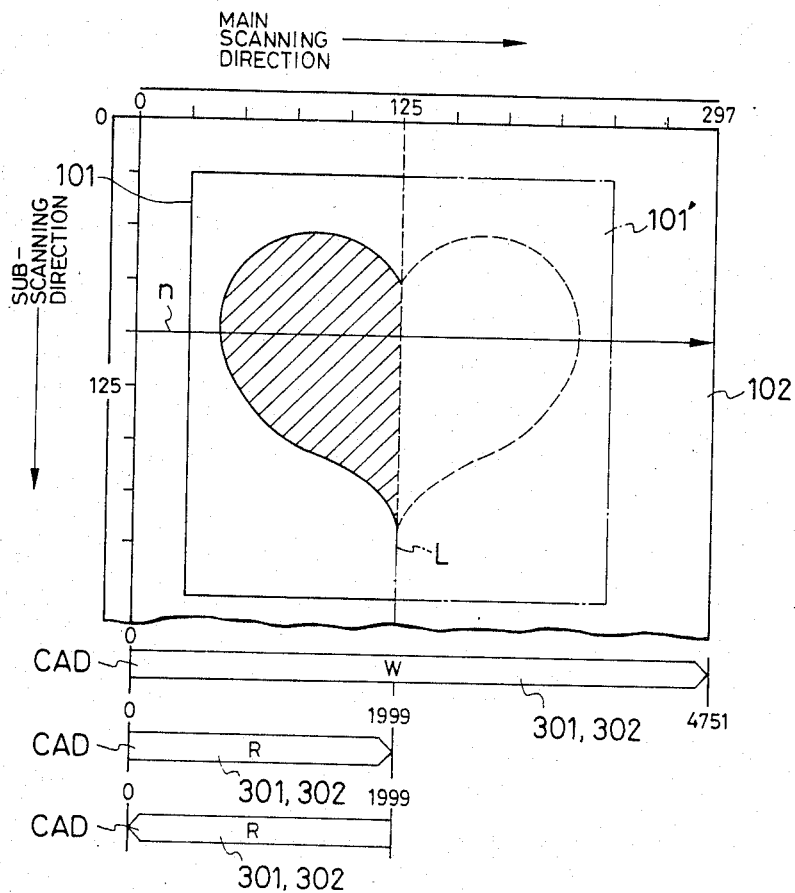
FIG. 7 is a schematic view showing a mirror image forming operation in the main scanning direction.

FIG. 7 shows a mirror image forming operation in the main scanning direction. The image data IVD are stored from address 0 to 4751 in each of the line buffers 301, 302, and the read-out operation is reversed at the address 2000. In this manner a normal image 101 and a mirror image 101' are synthesized.

It is also possible to release a mirror image ony starting from a designated position. At first the counter 306 counts up from address 0 at a high speed. If the mirror image forming operation is enabled and if the register 506 stores a value "2000", the AND gate 312 releases the signal DPLS when the count of the digit counter 306 reaches "2000", and the flip-flop 310 is set at the start of said signal.

The output signal DCNT of said flip-flop 310 shifts the digit counter 306 from the upcount mode to the downcount mode, and is also supplied to the line read-out control circuit 308. In response to the up-shift of the signal DCNT, said circuit 308 generates an excessive pulse with a predetermined delay. In response, the digit counter 306, which is already in the downcount mode at this point, is decreased by one to "1999". Consequently the inverted read-out of the image data starts from the address 1999.

If the maximum number of pixels in a line is 4752, an inverse read-out from the address 2000 as explained above reaches the address 0 before the end of counting operation of a line. Therefore, when the signal DCNT is shifted to the high level and when the digit counter 306 reaches zero, the line read-out control circuit 308 disables the input of the AND gate 315, thereby preventing doubled output of the data of the address 0.

Figure 8A:
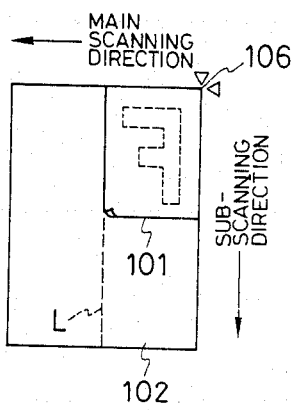
FIGS. 8A and 8B are views showing examples of mirrors image output in said embodiment.
Figure 8B:
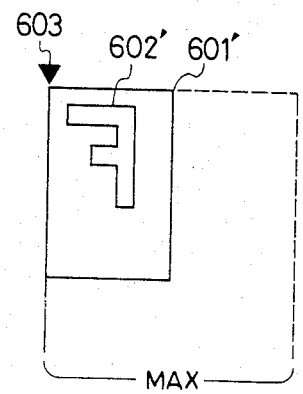

FIGS. 8A and 8B illustrate examples of the mirror image output in this case. By designating an inversion axis L in FIG. 8A, there is obtained an image as shown in FIG. 8B. In this case the image output position can be easily determined, since the output mirror image 602' appears close to a reference position 603 of a recording sheet 601. Also there can be employed a recording sheet 601' of a suitable width.

Figure 9:
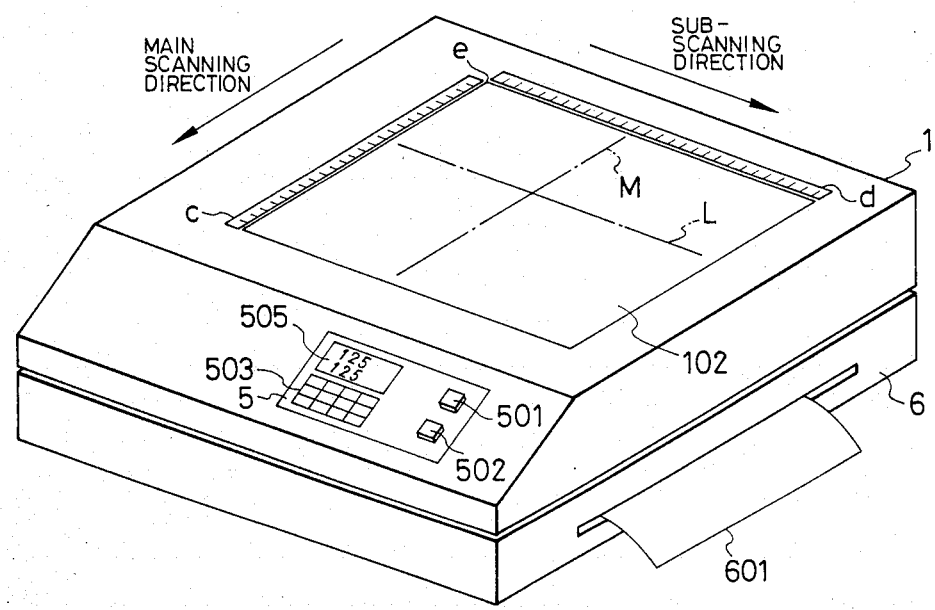
FIG. 9 is an external perspective view of said embodiment.

FIG. 9 is an external perspective view of the apparatus of the present embodiment. As an example the inversion axis L can be designated at a point of 125 mm in the main scanning direction from the reference position e for placing the original, by entering "125" with the numeral keys. In response an LED is turned on at a position close to 125 mm from the reference position e, in a scale c composed of an array of plural LED's in the main scanning direction. Said axis designation may be made with coordinate input means such as a digitizer, instead of said numeral keys. Also the position of the mirror image can be displayed not oly by the LED but also numerically by a liquid crystal display on a 7-segment display unit positioned in the vicinity of the original support glass 102 or in the operation unit 5.

Also said designation used not necessarily be made at every millimeter but can be made at every 10 millimeters or as ½ or ¼ of the width in the main scanning direction. Similarly the inversion axis M in the sub scanning direction can be arbitrarily designated with the numeral keys 503 of the console 5, and both designated values are displayed on the display unit 505.

Figure 10:
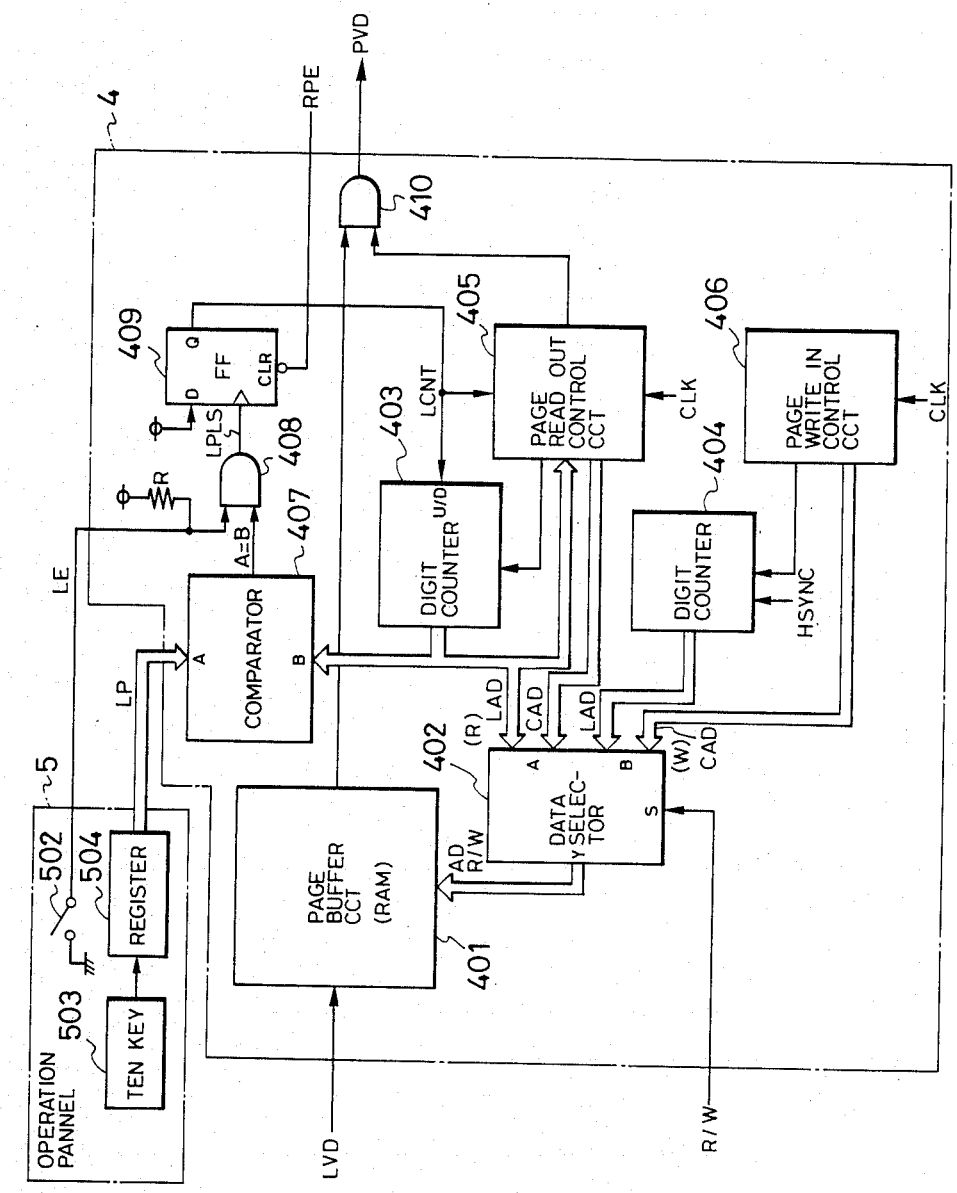
FIG. 10 is a block diagram of a page buffer circuit.

In the foregoing there is explained the formation of a normal image, a mirror image and a synthesized image through the read-out operation of the line buffers 301, 302, but the apparatus of the present embodiment is also provided with an inversion axis M perpendicular to the sub-scanning direction. FIG. 10 is a block diagram of a page buffer circuit provided for this purpose. Said page buffer circuit may be dispensed with if said inversion axis M for forming a mirror image in the subscanning direction is unnecessary. This is because the original document may be rotated in most cases, so that the main scanning direction and the sub scanning direction need not be strictly distinguished. In such case the image data LVD are directly supplied to the laser beam printer 6.

In FIG. 10, a page buffer 401 has a capacity of an image. A page read-write control signal R/W is initially at the high level to select an input B of a data selector.

The line address LAD of a line counter 404 counts up for each main scanning line, and image data LBD are stored line by line, according to digit addresses released from a page write-in control circuit 406. Said image data LVD may contain those already subjected to a mirror image conversion. In this manner there can be obtained, from an original image of 1/4 size, inverted images symmetrical with respect to the inversion axes L, M in the main and subscanning directions.

Then, in the read-out operation, said read-write control signal R/W is at the low level to select the input A of the data selector. The line address LAD of the line counter 403 is increased or decreased under the control of address control means 405, 407, 408, 409, the image data LVD are read line by line according to the digit address CAD released from a page read-out control circuit 405. The count inverting position of the line counter 403 can be arbitrarily determined from an operation panel 5.

More detailedly, a number of lines (for example number of main scanning lines) entered by the numerical keys 503 is stored in a register 504 and is supplied to an input terminal A of a comparator 407, of which the other input terminal B receives the count of a line counter 403. Thus, when the line counter 403 counts up to a designated line, the output terminal A=B of the comparator 407 releases a high-level signal, whereby the trigger signal LPLS from an AND gate 408 if the mirror image forming operation in the sub-scanning direction is enabled, corresponding to the open state of a switch 502. In response there is set a flip-flop 409, of which output signal LCNT shifts the line counter 403 from the upcount mode to the down-count mode. Simultaneously said signal LCNT is supplied to a page read-out control circuit 405, which in response supplies a "−1 count pulse" to the line counter 403, with a slight delay from the start of said signal LCNT.

More detailedly, the read-out line address is set to "1" after the initial image data at a line address 0 is read. Thus the image data at the line address 1999 corresponding to the designated line, for example at 125 mm from the reference position e, is read as the data of 2000th line, and then the read-out line address is set to "2000", which coincides with the content of the register 504. If the mirror image forming operation in the sub scanning direction is enabled, an AND gate 408 generates the signal LPLS to set a flip-flop 409 at the start of said signal. The output LCNT of said flip-flop 409 shifts the line counter 403 from the upcount mode to the downcount mode and is simultaneously supplied to a page read-out control circuit 405, in order to generate a "−1 count pulse" therefrom. In response said circuit 405 releases an additional pulse with a slight delay from the upshift of the signal LCNT. In response, the line counter 403, which is already in the downcount mode at this point, is decreased by one to "1999". Consequently the inverse read-out of the image data starts from the 1999th line. If the maximum number of lines is 4752, an inverse read-out from the address 2000 as explained above reaches the line address 0 earlier. Therefore, when the signal DCNT is shifted to the high level and when the line counter 403 reaches zero, the page read-out control circuit 405 disables the downcount operation thereafter and also disables the input of the AND 410, thereby preventing doubled output of the data of the line address 0.

Figure 11:
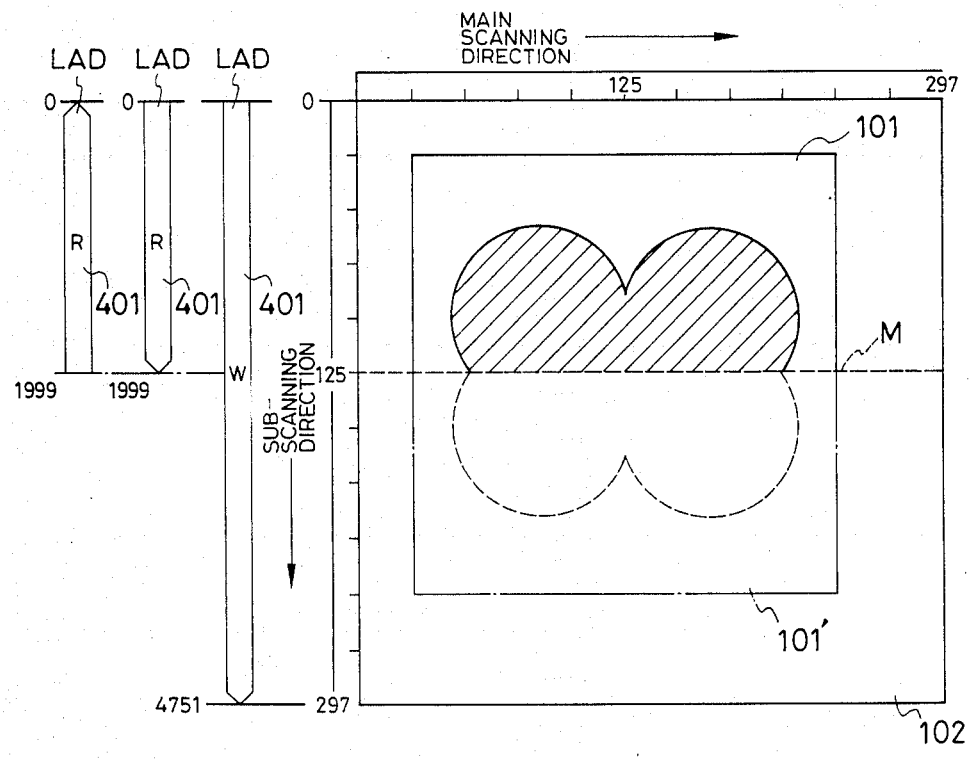
FIG. 11 is a schematic view showing a mirror image forming operation in the sub scanning direction.

FIG. 11 shows a mirror image forming operation in the sub scanning direction. The image data LVD are stored from address 0 to 4751 in the page buffer 401, and the read-out operation is reversed at the address 2000. In this manner a normal image 101 and a mirror image 101' are synthesized.

In the foregoing the data is stored in the address 0 to 4751 of the page buffer, and the readout operation is reversed from a designated address, for example 1999, to the address 0. However the mirror image formation is not limited to such method, but can also be achieved, for example, by decreasing the readout address from 1999 to 0 and then reversing the addressing to 1. In such case the inverting axis lies at the address 0 in the main scanning direction.

In the foregoing embodiment the inversion axis L in the main scanning direction is fixed or made variable while the inversion axis M in the sub scanning direction is made variable, but it is also possible to fix said inversion axis M in the sub scanning direction and to render the inversion axis L in the main scanning direction variable. It is furthermore possible to fix both axes or render both axes variable.

Also the image data may be supplied not only from an image reading apparatus but also from an image file or an image data receiving apparatus. Furthermore the printer may be replaced with an image file or a display unit.

As explained in the foregoing, a synthesis of a normal image and a mirror image enables simpler and more exact formation of a line-symmetric pattern, without the conventional paste-up work.

For example patterns in the books of knitting works or embroideries are often shown only in half because such patterns are symmetric with respect to a center line, but the apparatus of the present invention allows complete patterns to be obtained in such case.

Though the present invention has been explained by preferrred embodiments thereof, it is not limited to such embodiment but is subject to various modifications and applications within the scope and spirit of the appended claims.

What is claimed is

1. An image processing apparatus comprising:
    input means for entering image data representing an original image on a line by line basis;
    memory means for storing the image data entered from said input means on a line unit basis, said memory means permitting the stored image date to be read out from an arbitrary memory location;
    means for designating an arbitrary reference position of the original image;
    means for reading out the image data from said memory means on a line unit basis; and
    means for controlling the reading out operation of said reading out means such that the image data stored in said memory means on a line unit basis in a first order is read out in a second order opposite to the first order from a memory location correponding to the reference position designated by said designating means.

2. An image processing apparatus according to claim 1, wherein said input means comprises means for scanning the original image and generating the image data.

3. An image processing apparatus according to claim 1, wherein said memory means is adapted to store the image data of at least a line.

4. An image processing apparatus according to claim 1, wherein said reading out means is adapted to control the read-out address of said memory means.

5. An image processing apparatus according to claim 1, further comprising means for forming an image on the basis of the image data read out from said memory means.

6. An image processing apparatus comprising:
input means for entering image data representing an original image on a line by line basis;
memory means for storing the image data entered from said input means on a line unit basis;
means for designating an arbitrary reference position of the original image;
means for reading out the image data from said memory means on a line unit basis;
means for detecting on a line unit basis that the image data corresponding to the reference position designated by said designating means is read out from said memory means; and
means for controlling the reading out operation of said reading out means such that during a period of read out of the image data on each line, read out order of the image data from said memory means is inverted in response to a detection output from said detecting means.

7. An image processing apparatus according to claim 6, wherein said input means comprises means for scanning the original image and generating the image data.

8. An image processing apparatus according to claim 6, wherein said memory means is adapted to store the image data of at least a line.

9. An image processing apparatus according to claim 6, wherein said reading out means is adapted to control the read-out address of said memory means.

10. An image processing apparatus according to claim 9, further comprising means for setting a read-out address of said memory means in accordance with the reference position.

11. An image processing apparatus according to claim 6, further comprising means for forming an image on the basis of the image data read out from said memory means.

12. An image processing apparatus comprising:
input means for entering image data representing an original image on a line by line basis;
memory means for storing the image data entered from said input means on a line unit basis;
means for reading out the image data from said memory means on a line unit basis;
means for detecting on a line unit basis that the image data of a predetermined memory location is read out from said memory means; and
means for controlling the reading out operation of said reading out means such that during a period of read out of the image data on each line, read out order of the image data from said memory means is inverted in response to a detection output from said detecting means.

13. An image processing apparatus according to claim 12, wherein said input means comprises means for scanning the original image and generating the image data.

14. An image processing apparatus according to claim 12, wherein said memory means is adapted to store the image data of at least a line.

15. An image processing apparatus according to claim 12, wherein said reading out means is adapted to control the read-out address of said memory means.

16. An image processing apparatus according to claim 12, further comprising means for designating an arbitrary reference position of the original image, wherein said predetermined memory location corresponds to the reference position.

17. An image processing apparatus according to claim 12, further comprising means for forming an image on the basis of the image data read out from said memory means.

18. An image processing apparatus comprising:
input means for entering image data representing an original image;
first designating means for designating a first reference position of the original image along a first direction;
second designating means for designating a second reference position of the original image along a second direction;
first processing means for processing the image data entered from said input means, and forming image data representing a mirror image based on the first reference position; and
second processing means for processing the image data entered from said input means, and forming image data representing a mirror image based on the second reference position.

19. An image processing apparatus according to claim 18, wherein said input means comprises means for scanning the original image and generating the image data.

20. An image processing apparatus according to claim 18, wherein said first processing means comprises memory means for storing the image data entered from said input means on a line unit basis, and control means for controlling on a line unit basis the reading out operation of said memory means in accordance with the first reference position.

21. An image processing apparatus according to claim 18, wherein said second processing means comprises memory means for storing a page of the image data entered from said input means, and control means for controlling the reading out operation of said memory means in accordance with the second reference position.

22. An image processing apparatus according to claim 18, wherein said second processing means processes the image data processed by said first processing means.

23. An image processing apparatus according to claim 18, further comprising means for forming an image on the basis of the image data processed by at least one of said first and second processing means.

* * * * *

UNITED STATES PATENT AND TRADEMARK OFFICE
CERTIFICATE OF CORRECTION

PATENT NO. : 4,807,044

DATED : February 21, 1989

INVENTOR(S) : YUTAKA KIKUCHI ET AL.   Page 1 of 3

It is certified that error appears in the above-identified patent and that said Letters Patent is hereby corrected as shown below:

SHEET 1

Figure 1, "OPERATION PANNEL" should read --OPERATION PANEL--.

SHEET 4

Figure 6, "OPERATION PANNEL" should read --OPERATION PANEL--.

SHEET 7

Figure 10, "OPERATION PANNEL" should read --OPERATION PANEL--.

COLUMN 1

Line 46, "sub scanning" should read --sub-scanning--.
    Line 68, "mirrors image" should read --mirror images--.

COLUMN 2

Line 6, "sub scanning" should read --sub-scanning--.
    Line 19, "main scanned," should read --main scanning,--.

COLUMN 4

Line 22, "sub" should read --sub- --.
    Line 23, "inversion axis 1" should read --inversion axis L--.

UNITED STATES PATENT AND TRADEMARK OFFICE
CERTIFICATE OF CORRECTION

PATENT NO. : 4,807,044

DATED : February 21, 1989

INVENTOR(S) : YUTAKA KIKUCHI ET AL.

It is certified that error appears in the above-identified patent and that said Letters Patent is hereby corrected as shown below:

COLUMN 5

Line 8, "AND data 312" should read --AND gate 312--.
    Line 16, "b" should be deleted.
    Line 21, "terminam" should read --terminal--.
    Line 25, "release" should read --releases--.
    Line 51, "the upshift of" should be deleted.
    Line 64, "ony" should read --only--.

COLUMN 6

Line 7, "up-shift" should read --upshift--.
    Line 20, "AND gate 315," should read
        --AND gate 312,--.
    Line 41, "oly" should read --only--.
    Line 45, "used" should read --need--.
    Line 48, "sub scanning" should read --sub-scanning--.
    Line 63, "sub scanning" should read --sub-scanning--.
    Line 66, "an" should read --one--.

COLUMN 7

Line 45, "sub" should read --sub- --.
    Line 64, "AND" should read --AND gate--.
    Line 68, "sub scanning" should read --sub-scanning--
        and "are" should read --is--.

UNITED STATES PATENT AND TRADEMARK OFFICE
CERTIFICATE OF CORRECTION

PATENT NO. : 4,807,044

DATED : February 21, 1989

INVENTOR(S) : YUTAKA KIKUCHI ET AL.

It is certified that error appears in the above-identified patent and that said Letters Patent is hereby corrected as shown below:

COLUMN 8

Line 16, "sub scanning" should read --sub-scanning--.
    Line 18, "sub scanning" should read --sub-scanning--.
    Line 38, "embodiment" should read --embodiments--.

Signed and Sealed this

Twenty-sixth Day of December, 1989

Attest:

JEFFREY M. SAMUELS

Attesting Officer      Acting Commissioner of Patents and Trademarks